Patented Nov. 25, 1941

2,264,123

UNITED STATES PATENT OFFICE 2,264,123

ACYL-ACETIC ARYLIDES HAVING SUBSTANTIVE PROPERTIES

Robert Schmitt, Darmstadt, and Hans Albert, Offenbach-on-the-Main, Germany, assignors to General Aniline & Film Corporation, a corporation of Delaware No Drawing. Application December 29, 1938, Serial No. 248,257. In Germany December 31, 1937

4 Claims. (Cl. 260—319)

The present invention relates to acyl-acetic arylides having substantive properties; more particularly it relates to compounds of the following general formula:

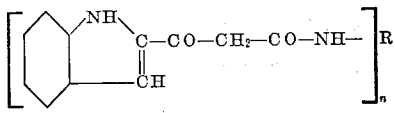

wherein $n$ stands for one of the numbers 1 and 2, and R means a radical of the benzene or diphenyl series.

For the purpose of producing ice-colors acyl-acetic arylides have been used which may be obtained by condensing aceto-acetic esters, benzoyl-acetic esters or aroylene-bis-acetic esters with amino-bases. Such arylides are described, for instance, in German Patents Nos. 390,666, 391,984, 409,949, 415,023, 419,813, 556,479 and 574,463. In practice, especially for dyeing hanks, a large number of these arylides can be used only to a limited extent since they have only a low affinity for natural or regenerated cellulose. Such azo-components are mainly concerned which are obtained from aceto- or benzoyl-acetic esters and mono-amino-bases of the benezene series. In order to impart to such products a sufficient affinity there must be used for the condensation mono- or diamino-bases of the aromatic series which have themselves substantive properties. Only the arylides from aroylene-bis-acetic esters and simple amino-bases show a distinct affinity for the cellulose fiber.

Now we have found that in general acyl-acetic arylides having substantive properties are obtainable by condensing with an aromatic amine an acyl-acetic ester whose acyl group is an indole-2-carboxylic acid radical which may contain substituents in the aryl radical.

The arylides obtainable by the invention are distinguished from the comparable acyl-acetic arylides known from the literature by a greater affinity for the natural or regenerated cellulose fiber and are, therefore, valuable intermediates for the production of insoluble azo dyestuffs on the fiber by the ice-color method.

The following example serves to illustrate the invention, but it is not intended to limit the invention thereto; the parts are by weight:

To a boiling mixture of 17.1 parts of 1-amino-2-methoxy-5-methyl-4-chlorobenzene and 250 parts of xylene there is slowly added, while well stirring, a solution of 23.1 parts of indole-2-carbonyl acetic ester, melting at 100° C. to 101° C., in 120 parts of xylene, and boiling is maintained until the elimination of alcohol is finished. After cooling, the entirely separated crystalline mass is filtered with suction, washed with xylene and dried. The indole-2'-carbonyl-acetyl-1-amino-2-methoxy-5-methyl-4-chlorobenzene of the following formula:

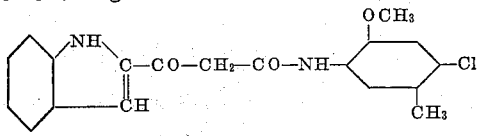

is thus obtained in the form of nearly colorless brilliant leaflets, melting at 219° C. to 220° C. The yield amounts to 85 per cent. of the theoretical.

In the same manner there are obtained by using equivalent amounts of other amines:

(1) Indole-2'-carbonyl-acetyl-1-amino-4-chloro-2:5 dimethoxybenzene of the formula:

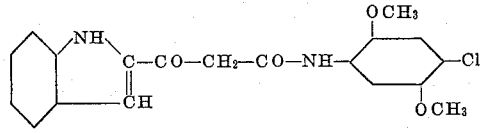

being a nearly colorless crystalline powder, melting at 217–218° C.

(2) Indole-2'-carbonyl-acetyl-1-amino-6-chloro-3.4-dimethoxybenzene being a colorless crystalline powder, melting at 189° C.–190° C.

(3) Indole-2'-carbonyl-acetyl-1-amino-4-benzoylamino-2.5-dimethoxybenzene being colorless needles, melting at 221–222° C.

(4) Indole-2'-carbonyl-acetyl-1-amino-4-ethoxybenzene being a nearly colorless crystalline powder, melting at 216–217° C.

(5) Bis-4:4'-(indole-2''-carbonyl-acetyl)-amino-3:3'-dimethyl-diphenyl of the formula:

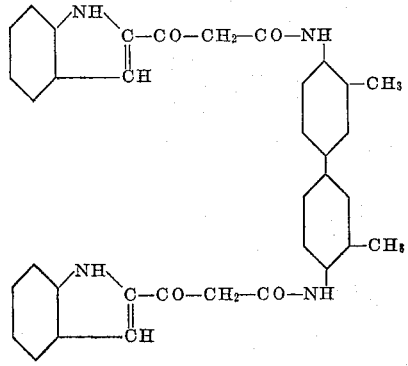

being a nearly colorless crystalline powder, melting at 281–282° C.

We claim:
1. The acyl-acetic arylides of the following general formula:

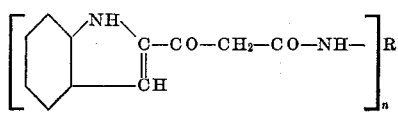

wherein $n$ stands for a number of the group consisting of the numbers 1 and 2, and R stands for a monocyclic aromatic radical when $n$ is 1 and a diphenyl radical when $n$ is 2, being colorless to nearly colorless crystalline substances which have a remarkable affinity for natural and regenerated cellulose fibers.

2. The indole-2'-carbonyl-acetyl-1-amino-4-chloro-2,5-dimethoxybenzene of the formula:

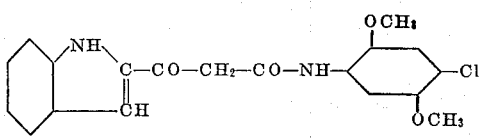

being a nearly colorless crystalline powder, melting at 217° C. to 218° C.

3. The indole-2'-carbonyl-acetyl-1 - amino-2- methoxy - 5 - methyl - 4 - chlorobenzene of the formula:

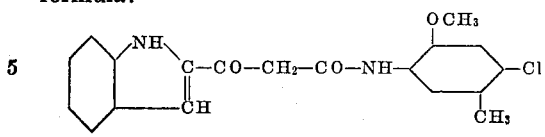

being nearly colorless brilliant leaflets, melting at 219° C. to 220° C.

4. The bis-4.4'-(indole-2''-carbonyl - acetyl) - amino-3.3'-dimethyl-diphenyl of the formula:

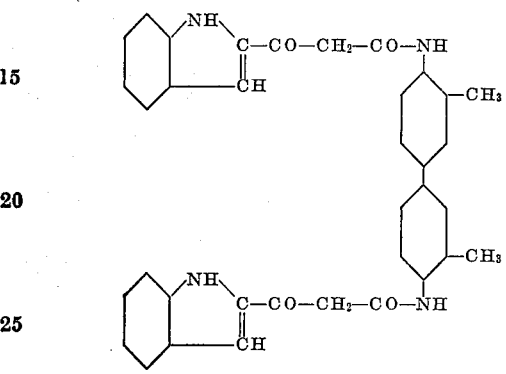

being a nearly colorless crystalline powder, melting at 281° C. to 282° C.

ROBERT SCHMITT.
HANS ALBERT.